United States Patent Office 3,403,992
Patented Oct. 1, 1968

3,403,992
METHOD OF TREATING SOIL COMPRISING ADDING A FERTILIZER AND A CHELATING AGENT TO THE SOIL
Georg Ludvig Busch, Copenhagen, Denmark, assignor to W. R. Grace & Co., New York, N.Y., a corporation of Connecticut
No Drawing. Filed Mar. 5, 1954, Ser. No. 414,507
Claims priority, application Sweden, Mar. 9, 1953, 2,197/53
11 Claims. (Cl. 71—1)

The present invention relates to a method and an agent for improving arable soil and other soils intended for cultivation of plants.

It is known that plants only with the greatest difficulty can take up phosphoric acid present in iron containing soils, particularly if the soils are acidic. In order to make the plants take up the phosphoric acid to the required extent, it is, therefore, necessary to add a great excess of phosphoric acid to the soils which is most uneconomical.

An object of the invention is, therefore, to provide a method of improving the soil in such a manner that the plants can more readily take up phosphoric acid from the said soil.

A further object of the invention is to provide a method of improving the soil in such a manner that the plants can more readily take up iron from the said soil.

A still further object of the invention is to provide an agent for improving soil which agent when added to the soil will make that the plants more readily will take up phosphoric acid from the said soil.

A further object of the invention is to provide an agent for improving soil which agent when added to the soil will make that the plants more readily take up iron from the said soil.

The method of this invention is in particular suitable for improving iron containing acidic soil.

The surprising discovery has been made that the above mentioned objects can be achieved by the addition of certain carboxylated and/or sulphonated amines to the soil. These carboxylated and/or sulphonated amines may be added separately to the soil but preferably they are added together or in admixture with one or more of the conventional fertilizers containing substances which are important for the plants, such as phosphorus, nitrogen, borium, potassium, calcium, magnesium, copper, zinc, cobalt and molybdenum. Examples of such fertilizers are ammonia or ammonium salts, e.g. ammonium sulphate, ammonium nitrate, or ammonium phosphate, and the like; other nitrogen containing substances, e.g. sodium nitrate, cyanamide, urea or urea-formaldehyde condensation products, and the like; phosphoric acid containing materials, such as mono, di or tricalcium phosphate, calcium metaphosphate, calcium-magnesium phosphate and superphosphate or triple superphosphate, and the like; potassium containing materials, e.g. potassium nitrate, potassium-magnesium sulphate, potassium chloride and potassium sulphate, etc.; and other useful elements containing materials and mixed fertilizers, containing one or more compounds of the above mentioned groups. Preferably, the substituted amines are added together with a phosphate containing fertilizer, particularly superphosphate. The fertilizer may also be natural manure such as dung or waste fertilizer, or one of the known synthetic nutrient substrates, such as polyacrylonitrile substrate. The fertilizer may be in powder-form, in paste-form or in liquid state.

The carboxylated and/or sulphonated amines used according to the invention have the following general structural formula

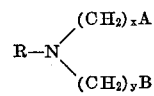

wherein $x$ is an integer from 1 to 3
$y$ is an integer from 1 to 3 and
A is a radical selected from the group consisting of $COO^-Me^+$ and $SO_3^-Me^+$,
B being a radical selected from the group consisting of A and OH
R being a radical selected from the group consisting of $(CH_2)_zD$, $C_6H_5$ and

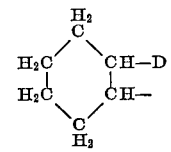

$z$ being an integer from 1 to 4, and
D being a radical selected from the group consisting of A and B as defined above, $CH_3$, $C_2H_5$, $C_3H_7$ such as

and

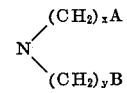

where A, B, $x$ and $y$ are as defined above, it being understood that the exact values of these symbols need not be identical at both ends of the formula, whilst Me is a cation of the group consisting of $H^+$, $K^+$, $Na^+$, $NH_4^+$, $Ca^{++}$, $Mg^{++}$, $Cu^{++}$ and $Zn^{++}$.

The carboxylated amines may be prepared in a known manner, e.g. by carboxylating low-molecular amines with low-molecular halogenated fatty acids or metal cyanides and aldehydes or by condensation of amines with unsaturated low-molecular fatty acids or nitriles thereof. Particularly suitable for use according to the invention, and also for economical reasons, are, for instance, compounds of the general formula

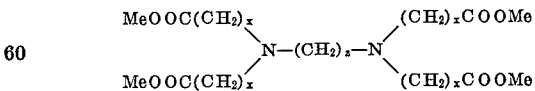

in which the symbols used have the meanings defined above, such as e.g. ethylene diamine tetraacetic acid, butylene diamine tetrapropionic acid and the like, and salts of such acids, and compounds of the formula

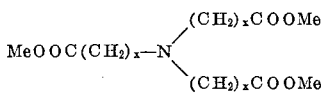

such as e.g. nitrilo triacetic acid, and the like, or salts of the said acids. In such salts there may be one or more free carboxyl groups.

Examples of sulphonated amines or amines containing both carboxyl groups and sulpho groups, if desired together with hydroxyl groups, and which also may be prepared in a known way, are the following, where the compounds are in the form of sodium salts, but it is to be understood that the free acids or salts of the other above mentioned metals or ammonium may also be used.

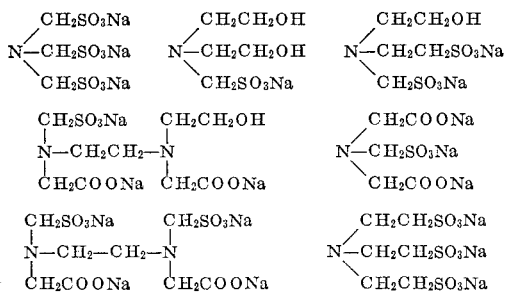

Preferred compounds of this group are compounds of the formula

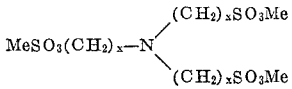

in which the symbols used have the meanings defined above, such as e.g. nitrilo trimethyl trisulphonic acid and salts thereof, and the like.

The carboxylated and/or sulphonated amines have two functions. Firstly, phosphoric acid occurring in the soil or present in the fertilizers is liberated so that the plant can assimilate it unimpededly, and, secondly, the iron in the soil is complexbound, (chelated). If the latter did not happen, the iron would bind the phosphoric acid, particularly in acidic soil.

Besides, the plant can now without difficulty take up the complex iron compounds and utilize the same in building up chlorophyll. This enhanced formation of chlorophyll is also of great importance for the vital power and growth of the plant.

Attempts have been made by adding iron vitriol to the soil in order to achieve the above mentioned effect but it has proved that the iron in the said compound can only be taken up by the plants to a very low extent.

The present carboxylated and/or sulphonated amines have high chemical resistance.

Besides, they are completely non-toxic to insects, fish, molluscs, and mammals, and they have no detrimental influence on the useful functions of the common putrefactive bacteria.

The invention will be illustrated by the following comparative examples showing the effect obtained by the addition of one of the agents according to the invention.

1 acre of acidic iron containing soil was manured with 328 kgs. of common technical superphosphate containing 20% of phosphoric acid.

Another acre of similar soil was manured in the same manner but only with 123 kgs. of a fertilizer consisting of 82 kgs. of the above mentioned superphosphate and 41 kgs. of the trisodium salt of ethylene diamine tetraacetic acid.

It turned out that approximately equally large crops of turnips were obtained on the two test soils but that the formation of chlorophyll in the tops was considerably higher in those turnips which had grown in the soil manured with the fertilizer activated with the carboxylated amine.

When the trisodium salt of ethylene diamine tetraacetic acid was replaced by other carboxylated amines, e.g. the calcium salt of butylene diamine tetrapropionic acid or the potassium salt of nitrilo triacetic acid, or one of the above mentioned sulphonated amines, e.g. nitrilo trimethane trisulphonic acid, similar results were obtained.

The ratio between the fertilizer and the activating substance is not critical and may be varied within wide limits, suitably in dependency on the iron content of the soil. Generally, the soil improving agent according to the invention will contain substantial amounts of both fertilizer and carboxylated and/or sulphonated amine. The carboxylated and/or sulphonated amines are preferably added to the fertilizer during or after the preparation thereof, or they are incorporated into the fertilizer immediately before its use. However, as mentioned above, the said amines may also be added separately. The amounts added to the soil are not critical but in order to obtain optimum effects they will be approximately such amounts as will be necessary for substantially chelating the free iron ions occurring in the soil to be improved.

Having thus fully described my invention I claim as new and desire to secure by Letters Patent:

1. In a method of enhancing the growth of plant life in earth soils, the step which comprises adding to the soil in which the plant life is grown a small amount of a microbiologically stable water-soluble organic chelating agent in admixture with commercial fertilizer.

2. The method of claim 1 wherein said chelating agent is an organic amine compound containing at least one amine nitrogen atom and at least one radical selected from the group consisting of —COOMe and —SO$_3$Me wherein Me is a cation selected from the group consisting of H$^+$, K$^+$, Na$^+$, NH$_4^+$, Ca$^{++}$, Mg$^{++}$, Cu$^{++}$ and Zn$^{++}$, said nitrogen atom being separated from said radical by an alkyl group having 1–3 carbon atoms.

3. The method of claim 1 wherein said chelating agent is a carboxylated amine.

4. The method of claim 1 wherein said chelating agent is a sulfonated amine.

5. The method of claim 1 wherein said chelating agent is ethylene diamine tetraacetic acid.

6. The method of claim 1 wherein said chelating agent is nitrolotriacetic acid.

7. The method of claim 1 wherein said chelating agent is nitrolotrimethyl trisulfonic acid.

8. In a method of enhancing the growth of vegetables, the step which comprises adding to the soil in which the vegetables are grown, in admixture with commercial fertilizer, a small amount of a microbiologically stable organic chelating agent corresponding to the formula $$(MOOC—H_2C)=N—CH_2—CH_2—N=(CH_2—COOM)_2$$

where M is a cation selected from the group consisting of alkali metal and ammonium.

9. In a method of improving a soil containing phosphoric acid and iron, the step which comprises adding to said soil a fertilizer and at least one iron-sequestering organic amine compound free from iron and containing at least one amine nitrogen atom and at least one radical selected from the group consisting of —COOMe and —So$_3$Me wherein Me is a cation selected from the group consisting of H$^+$, K$^+$, Na$^+$, NH$_4^+$, Ca$^{++}$, Mg$^{++}$, Cu$^{++}$ and Zn$^{++}$, said nitrogen atom being separated from said radical by an alkyl group having 1–3 carbon atoms, thereby making the phosphoric acid in said soil more readily accessible to plants growing in said soil.

10. The method according to claim 9, wherein the fertilizer is a phosphate.

11. The method according to claim 10, wherein the phosphate is superphosphate.

References Cited
UNITED STATES PATENTS
2,222,734 11/1940 Bancroft et al. ---------- 71—27
2,222,736 11/1940 Bancroft et al. ---------- 71—64
2,222,737 11/1940 Bancroft et al. ---------- 71—64
2,828,182 3/1958 Cheronis et al. ------ 71—2.5 X

OTHER REFERENCES
Agricultural Chemicals—Zussman, Sequestering 2,4-D, April 1949, pp. 27–29 and 73.

Plant Physiology—Jacobson, Maintenance of Iron Supply . . . . Addition of Ferric Potassium Ethylenediamine Tetraacetate, April 1951, pp. 411–413.

Agricultural Chemicals—Alexander et al., Control of Iron Chlorosis, July 1952, pp. 36–38.

Agricultural Chemicals, "Control of Iron Chlorosis," July 1952, pp. 36–38. (Copy in Div. 59.)

Science, "Chelates as Sources of Iron for Plants Growing in the Field," Nov. 21, 1952, pp. 564–66. (Copy in Div. 59.)

The Versenes, Tech. Bulletin No. 2, Bersworth Chemical Co., fifth edition, July 1952, pp. Sec. I 3, 20 (copy in Div. 64).

S. LEON BASHORE, *Acting Primary Examiner.*